United States Patent [19]

Junk et al.

[11] 3,745,866
[45] July 17, 1973

[54] SELF-FEEDING DOUBLE-CUT SAW
[75] Inventors: Thomas A. Junk; Carl P. Junk, both of Colorado Springs, Colo.
[73] Assignee: Component Equipment Manufacturing, Inc., Colorado Springs, Colo.
[22] Filed: Dec. 22, 1970
[21] Appl. No.: 100,668

[52] U.S. Cl.............. 83/423, 83/425.2, 83/433, 83/435.2
[51] Int. Cl....... B27b 25/04, B27b 7/04, B26d 7/06
[58] Field of Search.............. 173/36, 37, 37 A, 173/37 B, 38, 49 R; 83/423, 425.2, 433, 435.2, 409, 409.1

[56] References Cited
UNITED STATES PATENTS

| | | | |
|---|---|---|---|
| 3,388,727 | 6/1968 | Kotila | 143/36 |
| 694,405 | 3/1902 | Moss | 143/49 R |
| 2,803,273 | 8/1957 | Ramsey et al. | 143/37 B |
| 1,802,514 | 4/1931 | Johnson | 143/37 A |

Primary Examiner—Donald R. Schran
Attorney—Anderson, Spangler & Wymore

[57] ABSTRACT

This invention relates to a saw for cutting a plurality of work pieces to the same length that is characterized by a pair of dog-carrying roller chains, one of which runs in fixed position on a headstock subassembly while the other runs parallel thereto on a transversely-adjustable tailstock subassembly. These chains cooperate with one another to carry the work pieces one at a time into the cutting area and they run in synchronized relationship because of a common drive shaft which can be driven at different speeds to vary the feed rate. One saw forms a part of the headstock subassembly while the other is a part of the tailstock subassembly and is, therefore, movable therewith. The saws are mounted in transversely-spaced parallel relation to one another about a common horizontal axis of rotation while one feed chain is longitudinally adjustable relative to the other so that the work pieces will move into the blades simultaneously in perpendicular relation to the planes defined thereby.

5 Claims, 12 Drawing Figures

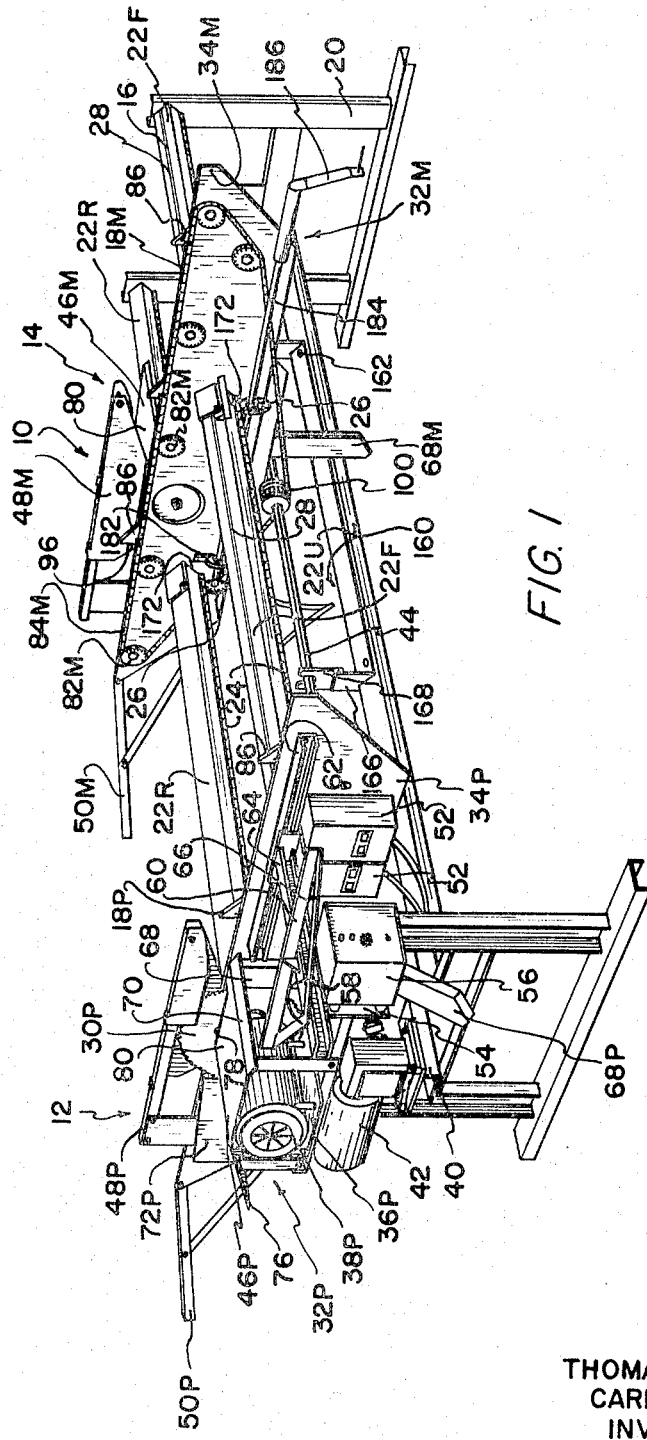

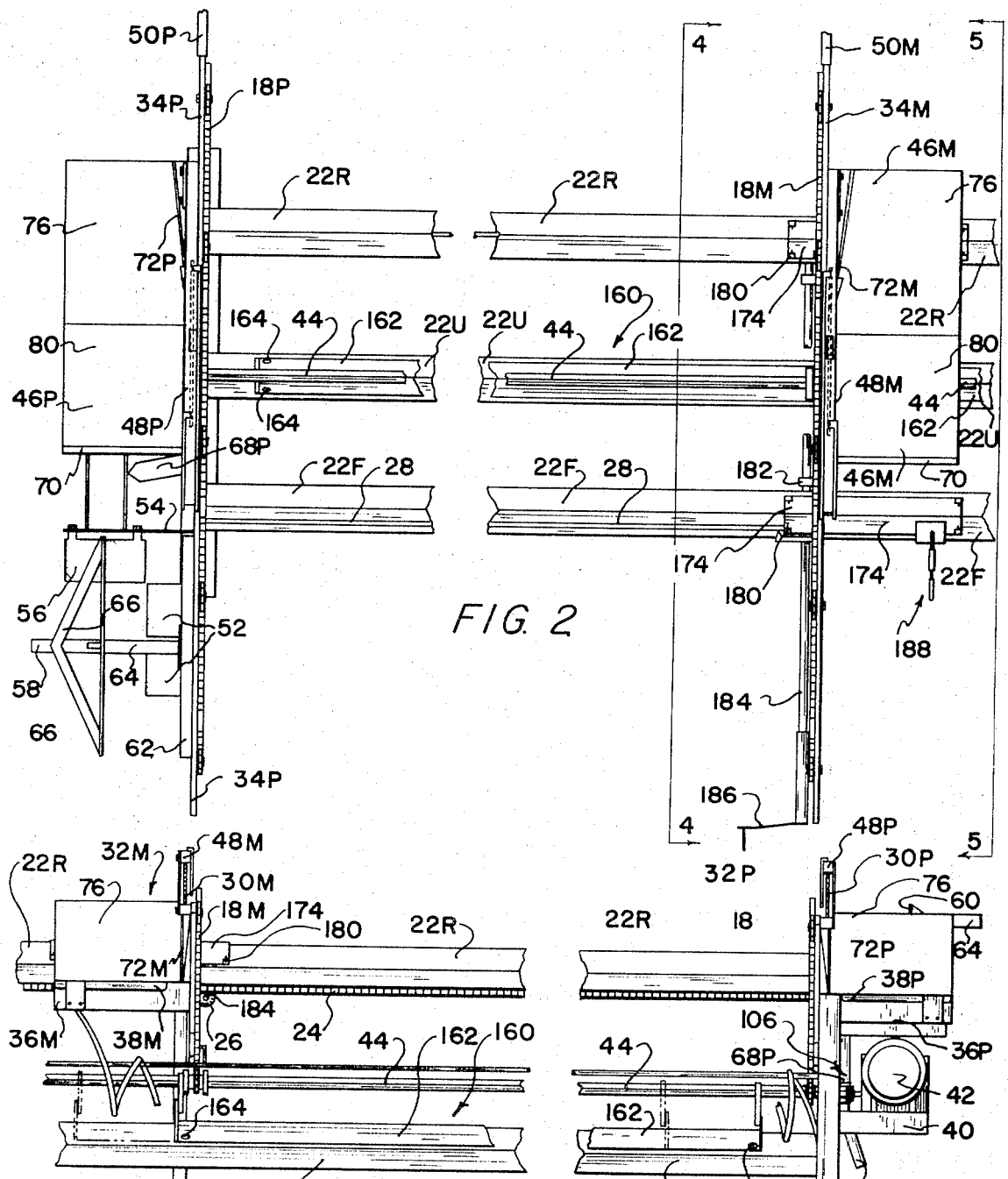

THOMAS A. JUNK
CARL P. JUNK
INVENTORS

ATTORNEYS

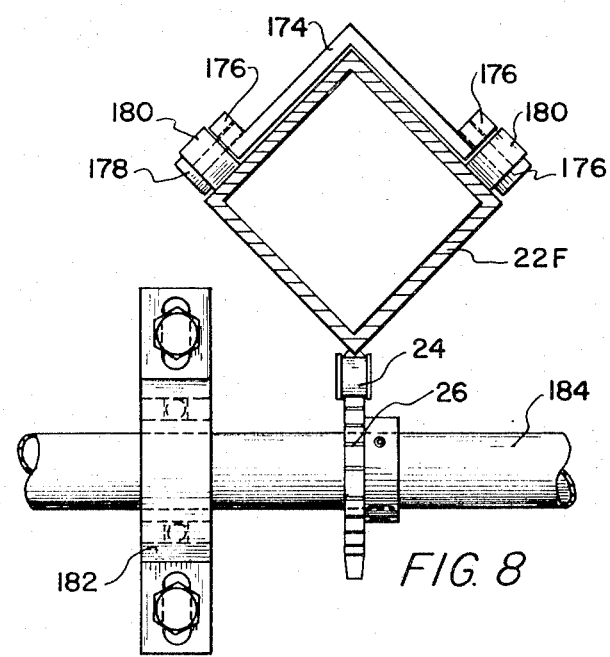
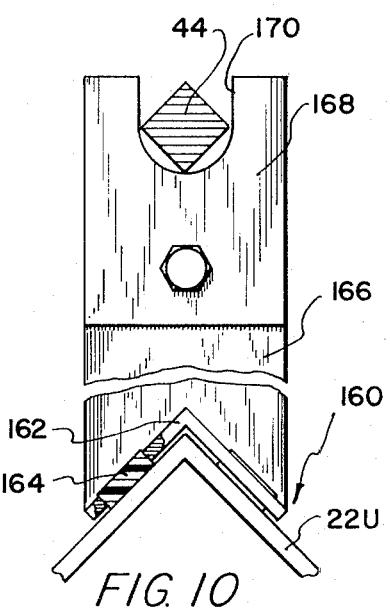
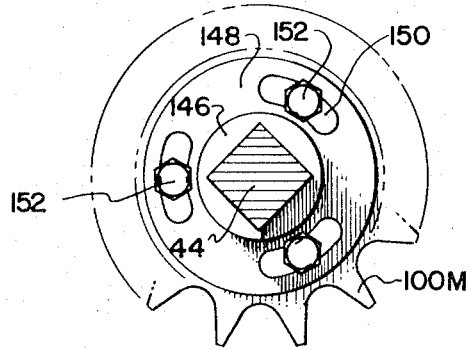
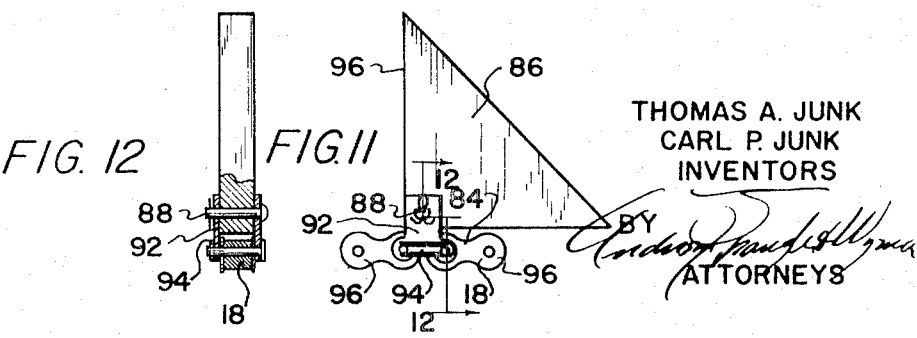

SELF-FEEDING DOUBLE-CUT SAW

Lumber mills, building contractors and even many lumber yards have a recurrent need for a double-cut saw that will square-cut both ends of a piece of dimension lumber simultaneously, do so rapidly, and provide means for varying the length of the work piece easily and accurately. Such a unit becomes especially useful when cutting a number of work pieces the same length such as, for example, wall studs. Also, it would be highly desirable to have such a unit provided with its own self-feeding mechanism automatically operable to orient the work pieces relative to the saw blades and push them therethrough.

It has now been found in accordance with the teaching of the instant invention that a double-cut saw of the type aforementioned can be made with a pair of electric-motor-driven circular saws mounted in transversely-spaced parallel relation to one another for rotation about a common horizontal axis. The saw blades are independently driven but mounted in subassemblies that are movable relative to one another so as to vary the spacing therebetween. The two circular saws are kept in a precise parallel relationship by means of transversely-extending parallel bedframe members that slidably mount the tailstock subassembly and the saw that forms a part thereof. Both the head and tailstock subassemblies also carry guided roller chain loops which parallel one another and cooperate to feed the work pieces one at a time into the saws. These chain loops both carry work piece-feeding lugs and one of the chains is longitudinally adjustable relative to the other so that the lugs will move in pairs paralleling the common axis of blade rotation when driven synchronously by a common sprocket drive.

Accordingly, it is the principal object of the present invention to provide a novel and improved self-feeding double-cut saw.

A second objective of the invention herein disclosed and claimed is to provide a unit of the type aforementioned that has a pair of dog-carrying roller chain conveyors mounted for both longitudinal and transverse adjustment relative to one another.

Another object is to provide a device for square-cutting both ends of a work piece simultaneously and to a precise, yet adjustable, length.

Still another objective is the provision of a high-capacity self-feeding saw having a self-aligning feature by means of which the work piece will be automatically oriented normal to the plane of blade rotation prior to reaching same.

An additional object is to provide a saw of the type forming the subject matter hereof that includes a yieldable roller chain drive train that will be overridden automatically in the event a kick-back or jam occurs when a work piece moves against the blades.

Further objects of the within described invention are to provide a dual-bladed high-capacity saw for cutting dimension lumber to length that is accurate, safe, versatile, simple to operate, easily adjusted, comparatively inexpensive, lightweight yet rugged, and readily adaptable to various types, grades and sizes of dimension lumber.

Other objects will be in part apparent and in part pointed out specifically herein in connection with the description of the drawings that follows and in which:

FIG. 1 is a perspective view looking down and to the right upon the double-cut saw of the present invention;

FIG. 2 is a fragmentary top plan view with both the center section and the end adjacent the movable tailstock subassembly having been broken away to conserve space;

FIG. 3 is a fragmentary rear elevation which, once again, has the center and one end broken away in the same manner as FIG. 3;

FIG. 8 is a further enlarged fragmentary detail, portions of which have been shown in section on the remainder in elevation, revealing the rack-and-pinion drive for the tailstock subassembly;

FIG. 9 is a fragmentary detail to an enlarged scale showing the circumferentially-adjustable drive sprocket for one of the dog-carrying roller chains, the drive shaft having been shown in section;

FIG. 10 is an enlarged fragmentary detail, certain portions of which have been broken away to conserve space and other portions broken away to reveal the interior construction, showing the adjustable support bracket and journal for the dog-chain drive shaft, the latter having been sectioned;

FIG. 11 is an enlarged fragmentary elevation showing a pair of adjacent roller chain links with the work piece-feeding dog attached therebetween; and, FIG. 12 is a section taken along line 12—12 of FIG. 11.

Figure 4:
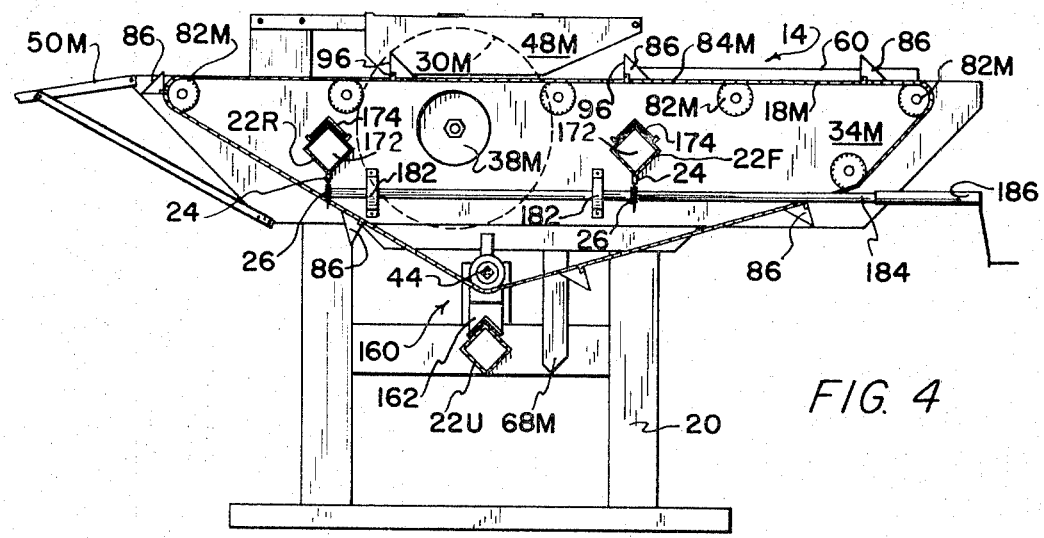
FIG. 4 is a longitudinal section taken along line 4—4 of FIG. 2 revealing the details of the movable tailstock subassembly and associated frame members.

Referring next to the drawings for a detailed description of the present invention and, initially, to FIG. 1 for this purpose, reference numeral 10 has been chosen to designate the double-cut saw in its entirety while numerals 12 and 14, similarly refer to the headstock and tailstock subassemblies, respectively, thereof. Both the headstock and tailstock subassemblies are mounted on a main bedframe 16, the former being fixed while the latter is movable therealong. For purposes of the present description as has been the case thus far, the term "longitudinally" will refer to the direction the work piece moves across the unit during the sawing operation and the term "transversely" will designate movement in a direction normal to the travel of the work piece. As so construed, the tailstock subassembly 14 moves transversely relative to the fixed headstock subassembly while the dog-carrying roller chain conveyor loop 18P and 18M reaved therein run longitudinally.

The bedframe 16 has floorstands 20 at opposite ends that are interconnected by three transversely-extending rails 22F, 22R and 22U, the alphabetical subscripts designating the location thereof in terms of "front," "rear" and "underneath," the unit being considered as feeding from the front where the operator stands to the rear where the cut work pieces are discharged. All three rails, in the particular form shown, are hollow and have square cross sections which are rotated 45° so that the diagonals rather than the sides thereof are horizontal and vertical, respectively. The two upper rails 22F and 22R are raised above the floor about the same distance and are displaced horizontally in parallel relation to one another while the third rail 22U is located beneath and between the latter. Permanently affixed to the lowermost corners of both the upper rails 22F and 22R are lengths of roller chain 24 that define the "racks" with which the sprocket wheel pinions 26 mesh that drive the tailstock subassembly 14 from side to side, all of which will be explained in somewhat greater detail in connection with FIG. 8. The upwardly and rearwardly-inclined face of rail 22F carries a scale 28 marked at appropriate intervals to indicate the transverse spacing between the blades 30P and 30M (FIG. 5) of the head and tail-stock subassemblies.

Next with reference to FIGS. 1, 2 and 3, it will be seen that the headstock subassembly 12 contains a fixed subframe generally referred to by numeral 32P and which includes a longitudinally-extending inverted generally trapezoidal mounting plate 34P, a horizontally-disposed plate 36P attached to the latter that carries saw motor 38P, a similar motor mount 40 for the gear motor 42 that drives the square drive shaft 44 of the roller chain feed conveyors 18. A shield 46P covers the saw motor and is attached to the mounting plate 36P of the subframe. The trapezoidal plate 34P carries a hinged saw blade guard 48P of conventional design that rests atop the work pieces and holds them down while they are being cut. The rear extremity of the trapezoidal subframe plate has a braced extension arm 50P attached thereto that receives the cut work pieces and holds them until they can be removed and stacked. The outside surface of this same plate mounts the stop-start switches for the individual saw motors while a bracket 54 attached to the latter carries conventional SCR speed controller 56 that governs the speed of the gear motor 42.

Figure 5:
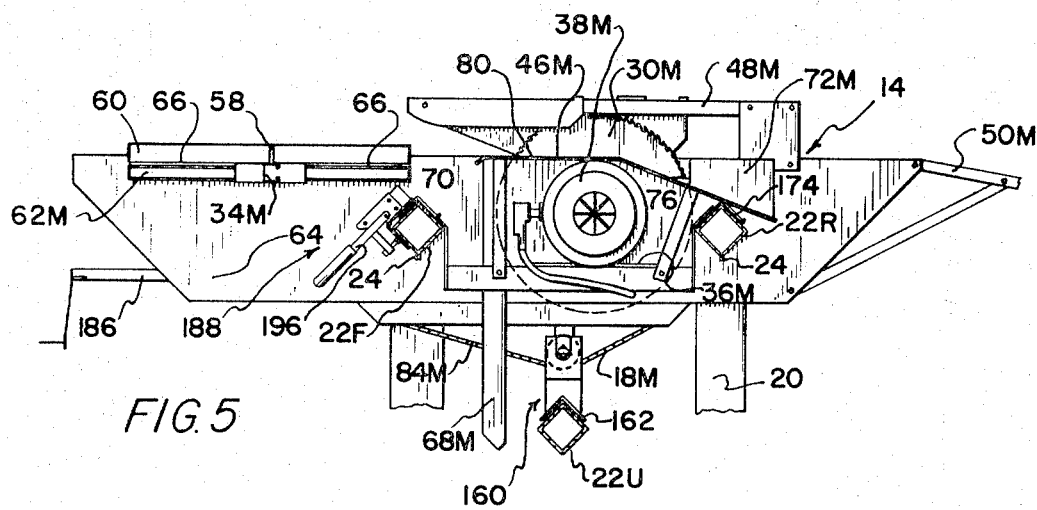
FIG. 5 is a longitudinal section taken along line 5—5 of FIG. 2 showing the opposite side of the tailstock subassembly.

In the preferred embodiment of the invention illustrated, the fixed subframe 36P also carries certain appurtenances which, while not absolutely necessary, improve the unit considerably. The first of these is fence 58, the longitudinally-extending element 60 of which abuts the left end of the work piece as it is placed across the roller chain feed conveyors 18. This fence includes a T-bracket, the crossbar 62 of which is fastened to the outside of subframe mounting plate 34P with the stem 64 thereof projecting horizontally and perpendicularly to the left as a support for element 60. While not specifically illustrated as such, both the crossbar 62 and the stem 64 of the T-bracket comprise lengths of "unistrut" which are detachably connected to one another so that the stem and its associated fence-forming element 60 can be removed from the fixed subframe 32P and remounted as shown in FIGS. 4 and 5 on the movable subframe 32M. For this purpose, a second crossbar 62M is fastened to the right-hand face of mounting plate 34M to receive this fence. Obviously, the fence 58 will be used on either the headstock or the tailstock but not both; however, there are occasions when one position is preferred over the other.

As is the case with most saw fences, they are adjustable so as to vary the length of the severed end. No attempt has been made here to detail the mounting of the fence-forming element 60 longitudinally on unistrut stem 64 because this is conventional and any one of many different types of adjustable saw fences will suffice quite well for purposes of the instant invention.

Another of the elements carried by plate 34P of the subframe 32P on the outside or left-hand face thereof is a sawdust duct 68P shown in FIG. 1. This duct is placed beneath shield 46P adjacent the downturned front edge 70 thereof and the rear wall is slit vertically to receive the leading edge of the blade just after the teeth thereof leave the work piece. These teeth carry the sawdust directly into duct 68 and it, in turn, conducts it down and to the left of the machine. A similar duct 68M is provided on the movable subframe 32M that forms a part of the tailstock subassembly.

A deflector 72P is located adjacent the trailing edge of the saw blade in position to engage the severed end pieces and get them out of the way of the ascending saw teeth on the trailing edge of the blade. A similar deflector plate 72M is provided on the right-hand face of the movable subframe's mounting plate 34M as has been most clearly shown in FIG. 5.

Having described the construction of the fixed subframe 32P and the appurtenances mounted on the outside face thereof, it will be well to refer briefly to FIGS 2, 3 and 5 and do likewise with the movable subframe 32M that forms a part of the tailstock subassembly 14 before looking at the roller chain conveyors 18 that are mounted on the inside thereof along with certain other elements. Some of the subframe elements together with the units carried thereby are but mirror images of the corresponding parts of the headstock subassembly 12. For instance, trapezoidal mounting plate is but a mirror image of plate 34P. Similarly, shield 46M, saw guard 48M, extension arm 50M, deflector plate 72M and saw motor 38M if one considers it must rotate in the opposite direction to motor 38P, are but mirror images of their counterparts on the fixed subframe. The mount 36M for the saw motor 38M is, of course, much the same regardless of which subframe it is attached to. Certain elements are missing from the movable tailstock subassembly 14 such as the gear motor 42 and its mounting bracket 40, the stop-start switches 52, and the SCR controller 56. Duct 68M is shown to be of a slightly different shape than duct 68P but its function remains the same. Only one gear motor is needed because the roller chain conveyor drive shaft 44 is common to both of said conveyors 18P and 18M.

Saw blades 30P and 30M are both mounted on the outside of their respective mounting plates 34P and 34M for rotation in closely-spaced relation to the shields 46. Actually, the horizontal portions 80 of these shields define the saw table upon which the ends of the work pieces are supported while the midportions thereof are supported on the feed conveyors 18.

The work piece conveying mechanisms 18 on the inside surfaces of the subframe mounting plates 34 of both subassemblies 12 and 14 are most clearly revealed in FIGS. 1–4, 11 and 12 to which reference will now be made. A series of idler sprockets 82P and 82M are journalled for rotation in longitudinal alignment with one another just below the top inside edge of each subframe mounting plate 34P and 34M to carry the upper horizontal runs of endless roller chain loops 84P and 84M. Each chain carries a plurality of triangularly-shaped dogs 86 fastened by a pin 88 and a cotter key 90 between the upstanding legs 92 of a specially-designed link 94 pivotally interconnecting adjacent links 94 of the roller chain as shown in FIG. 11. The vertical edge 96 of each dog projects above the top of subframe plate 34 and engages the trailing edge of the work piece pushing it longitudinally from front to rear across the top of the bedframe. These dogs 86 are located at equally-spaced intervals and are the same distance apart on both chains. As will be explained presently in connection with FIGS. 7 and 9, one of the roller chain drive sprockets 100M is circumferentially adjustable relative to the other of said drive sprockets 100 so as to place the chain dogs in transversely-aligned pairs adapted to move the work pieces at right angles to the saw blades so as to square-cut the ends thereof. Since only the dogs project above the top edge of the subframe plates 34, transversely-aligned pairs thereof will cooperate to align a skewed work piece prior to its being fed to the saw blades.

Figure 7:
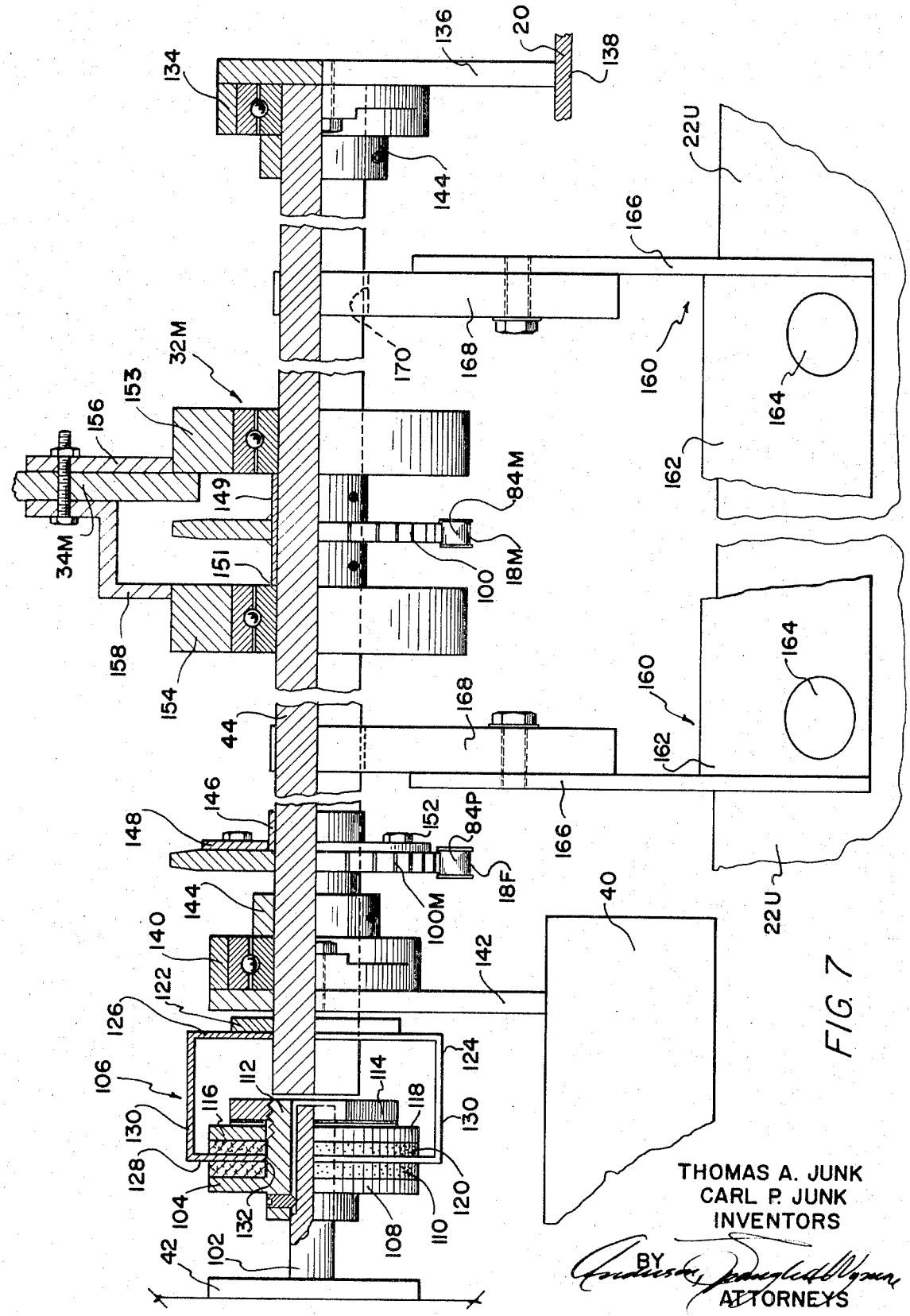
FIG. 7 is an enlarged fragmentary view, half in elevation and half in section and with portions broken away to conserve space, showing the drive for the dog-carrying roller chain loops.

Now, the drive for the roller chain conveyors 18M and 18F is most clearly revealed in FIGS. 7, 9 and 10 to which reference will now be made. The output shaft 102 of the gear motor 42 has the drive element 104 mounted thereon of a friction clutch that has been indicated in a general way by numeral 106. In the particular form illustrated, drive element 104 has an annular flange 108 that mounts a friction disk 110 on the face thereof. Projecting through the center of disk 110 is an externally-threaded tubular hub 112 that is in coaxial relation to the output shaft and onto which is screwed a nut 114 that moves a second friction element 116 axially toward the first. The latter friction element 116 includes a backing plate 118 faced by a friction disk 120.

The driven element of the clutch includes a collar 122 fastened to shaft 44 for conjoint rotation therewith, and a generally-rectangular connector 124 having one vertical wall 126 attached to the collar with the other vertical wall 128 disposed between the friction disks 110 and 120. Walls 126 and 128 are bridged by connecting walls 130 as shown. Wall 128 has a central aperture 132 therein that is slightly larger than the outside diameter of the hub so as to loosely receive the latter. The extent to which nut 114 is tightened determines, of course, how tightly the driven element 124 is squeezed between the friction disks and, therefore, the yield-point of the clutch.

Shaft 44 is, of course, journalled for rotation in coaxial relation to the motor shaft 102. One shaft journal 134 is located on the face of an upstanding plate 136 mounted atop cross frame element 138 of the right-hand floor stand 20. The other journal 140 is carried on the face of a similar plate 142 mounted atop the gear motor mounting plate 40. Collars 144 fastened to the square shaft 44 lie adjacent the journals and retain the shaft against axial movement.

The drive sprocket 100M that lies in the vertical plane of roller chain loop 84P in the headstock subassembly 12 is most clearly revealed in FIGS. 7 and 9 to which reference will now be made. A flanged collar 146 is fastened to the shaft 44 for conjoint rotation therewith in fixed position intermediate its ends. The flange 148 thereof includes a series of angularly-spaced arcuate slots 150 curved about the axis of shaft rotation, three of such slots having been shown in FIG. 9 spaced 120° apart. Bolts 152 passing through these slots into the sprocket 100M enable the latter to be adjusted circumferentially relative to shaft 44 so as to place the dogs 86 carried by chain 84P in proper transverse alignment with its counterpart on the other roller chain 84M. Thus, movement of the work pieces into the saw blades at right angles to the planes in which they turn is assured so that square-cut ends will be produced.

Returning again to FIG. 7 by itself, it will be noted that sprocket 100 that meshes with the other roller chain loop 84M is not provided with means for adjusting it rotarially relative to shaft 44 as was the case with sprocket 100M, but rather, it includes a hub 149 with a square hole 151 therethrough that is sized to receive said shaft and slide axially therealong.

Bracketing hub 149 on both the right and left ends thereof are a pair of shaft journals 153 and 154 that are, in turn, fastened by brackets 156 and 158 to opposite sides of the mounting plate 34M of the movable subframe 32M. Thus, as the tailstock subassembly is run to-and-fro along the three rails 22, these journals 152 and 154 carry the sprocket 100 along the shaft 44 to the same position so that it maintains in vertical coplanar relation to the idler sprockets 82M and roller chain loop 84M reaved therearound.

Now, in reasonably short version of the saw, up to say 10 feet long, shaft 44 is adequately supported by journals 134 and 140 at opposite ends thereof along with those (152 and 154) intermediate its ends that move with the tailstock subassembly 14. In longer versions of the unit, on the other hand, it is advisable to further support the unsupported sections of shaft 44 extending to the right or left or both ways from the tailstock depending upon its transverse position. For this purpose, an additional shaft-supporting structure has been provided that is broadly referred to by reference numeral 160 and which is most clearly shown in FIGS. 7 and 10 to which reference will now be made. This structure includes an angle iron section 162 having a length somewhere around half the length of the rails 22 that is turned as shown in FIG. 10 so as to conform with and slide along the top of bottom rail 22U. This angle iron is supported in spaced relation to the mating surfaces of the rail by Nylon pads 164 located at least on both flanges and at both ends if not therebetween. These pads, of course, support angle iron element 162 for slidable movement along the rail 22U.

Upstanding metal brackets 166 are fastened to opposite ends of the angle iron and Nylon cradles 168 with a U-shaped notch 170 in the top edge thereof sized to receive and journal shaft 44 for rotation therein are bolted to the brackets. Now, it is obvious that by sliding this shaft-supporting structure along the lower rail 22U, the cradles 168 can be placed in position to support the unsupported sections of shaft 44 somewhere between the headstock and tailstock and between the tailstock and right-hand floor stand. With the tailstock located closely adjacent one end or the other, only one of the cradles will be functional but it will be most important due to the long unsupported length of the shaft.

The next feature of the invention that requires a detailed examination is that of the mounting of the tailstock subassembly 14 on the rails 22 and the mechanism for moving the latter to-and-fro relative to the headstock, all of which are most clearly disclosed in FIGS. 1-5 and 8 to which reference will now be made. The mounting plate 34M of subframe 32M is provided with a pair of longitudinally-spaced square openings 172 sized and positioned to loosely receive the upper rails 22F and 22R. Fastened within the upper part of these openings 172 so as to project onto both sides of mounting plate 34M (see FIGS. 4 and 5) are inverted V-shaped saddles 174 having outturned ears 176 at their free edges that carry pins 178 upon which rollers 180 are rotatably fastened. Since the flanges of the saddles terminate short of the corresponding surfaces of the rails 22F and 22R atop which they ride, the rollers engage the latter and support the tailstock subassembly for rolling engagement therealong.

A pair of pillow blocks 182 are fastened to the left-hand face of the mounting plate 34 or just below and inside the rails 22R and 22F (see FIG. 4) and they journal the crankshaft 184 that carries the previously-mentioned pinion-forming sprockets 26 that mate with the roller chain 24 and cooperate therewith to define the rock-and-pinion drive for moving the tailstock subassembly relative to the headstock. A crank 186 on the front end of the crankshaft is used by the operator to make the aforementioned adjustments.

Figure 6:
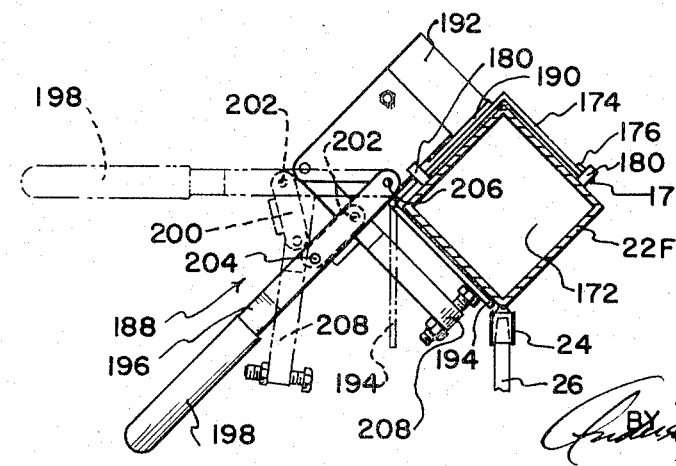
FIG. 6 is a fragmentary sectional detail showing the toggle connector by means of which the tailstock subassembly is held in adjusted position on the bedframe.

Finally, with reference to FIGS. 5 and 6, the toggle mechanism 188 that is used to releasably lock the tailstock subassembly in adjusted position will now be described in connection with FIGS. 5 and 6. A bracket 190 having an upstanding flange 192 is fastened atop the front flange of the saddle 174 that rides along front rail 22F. As illustrated, this bracket is on the right side of the mounting plate 34M because otherwise it would likely interfere with the operation of the rock-and-pinion drive described above. A plate 194 is hingedly attached to the front edge of this bracket for movement between the disengaged position shown by broken lines in FIG. 6 and the engaged position revealed in full lines in which said plate parallels the lower front face of the rail 22F and defines a brake shoe.

A conventional toggle clamp 196 is fastened to the upstanding flange 192 of the bracket in position such that movement of the operating handle 198 downwardly will cause toggle link 200 to align itself with the latter thereby moving center pivot 202 across the straight line define by pivots 204 and 206 thus moving the actuating arm 208 from its broken line disengaged position into the solid line engaged position holding hinged plate 194 in braking contact with rail 22F.

What is claimed is:

1. The double-cut saw which comprises: a transversely elongate bedframe including a pair of horizontal rails mounted in longitudinally-spaced parallel relation to one another; a fixed subframe having a first longitudinally-extending vertically-disposed mounting plate attached to one end of the bedframe; a movable subframe mounted on the rails for relative movement toward and away from the fixed subframe, said movable subframe including a second longitudinally-extending vertically-disposed mounting plate located in transversely-spaced parallel relation to said first mounting plate; first circular saw means including a motor and a saw blade driven thereby mounted on the fixed subframe with a portion of said blade projecting above the first mounting plate in parallel relation alongside thereof; second circular saw means including a motor and a blade driven thereby mounted on the movable subframe for movement therewith, the blade of said second circular saw means being mounted alongside said second mounting plate of the latter for rotation in transversely-spaced parallel and coaxial relation to the blade of the first circular saw means; and, first and second feed conveyor means cooperating with one another to feed work pieces one-at-a-time to the first and second saw means simultaneously, each of said conveyor means including at least two idler sprockets journalled for rotation in longitudinally-spaced and aligned relation to one another adjacent the top edge of one of the first and second mounting plates, a transversely-extending drive shaft journalled for rotation at opposite ends of the bedframe about an axis paralleling the rails thereof, a first drive sprocket mounted on said drive shaft for rotation therewith in coplanar relation with the idler sprockets carried by the first mounting plate, a second drive sprocket mounted on said drive shaft for rotation therewith and for slidable movement therealong, bifurcated yoke means carried by the movable subframe positioned and adapted to engage the second drive sprocket on opposite sides thereof and maintain same in coplanar relation to the idler sprockets carried by the second mounting plate in all adjusted positions of the latter, an endless loop of roller chain reaved about each coplanar set of idler and drive sprockets, tranversely-aligned pairs of dogs mounted on the roller chains for movement along the top edges of the first and second mounting plates projecting thereabove, drive means operatively connected to the drive shaft for driving both chain loops at the same speed and in a direction to push a work piece laid thereacross ahead of a pair of said dogs into the first and second saw means, and adjustment means interposed between the drive shaft and one of said first and second drive sprockets operative upon actuation to effect relative rotation therebetween so as to enable one series of chain dogs to be brought into transverse alignment with the companion series thereof carried by the other chain while maintaining a constant tension in the roller chain associated with the sprocket thus adjusted.

2. The double-cut saw as set forth in claim 1 in which: the adjustable means comprises a flanged hub fixedly attached to the shaft and mating in face-to-face relation with the drive sprocket operatively associated therewith, one of said mating elements carrying at least two angularly-spaced circumferential slots and the other pin-type fasteners positioned to enter same, said fasteners and slots cooperating in loosened condition to permit the relative rotational movement and in tightened condition to fasten same together for conjoint rotation.

3. The double-cut saw as set forth in claim 1 in which: the bedframe includes a third rail located in vertically-spaced parallel relation beneath the conveyor drive shaft; and, in which shaft-supporting means is mounted atop the third rail for adjustment in the direction of the length thereof, said means including at least one upstanding bracket member bridging the gap between said rail and conveyor drive shaft, and said bracket member including a notch in the upper edge thereof positioned and sized to cradle said shaft and prevent it from sagging.

4. The double-cut saw as set forth in claim 3 in which: the shaft-supporting means includes an elongate saddle-forming element mounted atop the third rail for slidable movement in the direction of the length thereof; and, in which two bracket members are mounted atop the saddle-forming element in position to bracket the movable subframe.

5. The double-cut saw as set forth in claim 3 in which: the conveyor drive shaft has a square cross-section; and, in which the bracket member includes a plastic portion in bearing-forming relation to said drive shaft.

* * * * *